US006853200B2

(12) United States Patent
Munser et al.

(10) Patent No.: US 6,853,200 B2
(45) Date of Patent: Feb. 8, 2005

(54) METHOD FOR RETRIEVING PREDETERMINED LOCATIONS IN SEWER AND PIPELINE SYSTEMS

(75) Inventors: Roland Munser, Karlsruhe (DE); Helge-Björn Kuntze, Stutensee (DE); Matthias Hartrumpf, Karlsruhe (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/239,580

(22) PCT Filed: Mar. 16, 2001

(86) PCT No.: PCT/DE01/01039

§ 371 (c)(1),
(2), (4) Date: Sep. 24, 2002

(87) PCT Pub. No.: WO01/73232

PCT Pub. Date: Oct. 4, 2001

(65) Prior Publication Data

US 2003/0076116 A1 Apr. 24, 2003

(30) Foreign Application Priority Data

Mar. 24, 2000 (DE) .......................................... 100 14 703

(51) Int. Cl.⁷ .............................................. G01R 27/32
(52) U.S. Cl. ....................................... 324/642; 324/637
(58) Field of Search ................................ 324/637, 648, 324/642; 356/153

(56) References Cited

U.S. PATENT DOCUMENTS

| 4,306,236 A | * | 12/1981 | Johnson ....................... 342/128 |
| 5,420,589 A | * | 5/1995 | Wells et al. ................... 342/22 |
| 5,742,517 A | * | 4/1998 | Van Den Bosch .......... 382/141 |
| 5,933,014 A | * | 8/1999 | Hartrumpf et al. ......... 324/642 |

FOREIGN PATENT DOCUMENTS

| DE | 43 40 059 C2 | 6/1995 |
| DE | 195 21 895 A1 | 12/1996 |
| DE | 196 00 085 A1 | 7/1997 |

* cited by examiner

Primary Examiner—Jay Patidar
Assistant Examiner—Walter Benson
(74) Attorney, Agent, or Firm—Venable LLP; Edward W. Yee

(57) ABSTRACT

A method for retrieving predetermined locations in sewer and pipeline systems after application or deposition of a layer of material. A carrier vehicle having a microwave sensor emits microwave signals and receives backscattered microwave signals. A first run is conducted inside the sewer or pipeline system before application or deposition of the layer of material. A first temporal signal profile of the backscattered microwave signals is recorded and the sought locations are marked in the first signal profile. After the application or deposition of the layer of material, a second run is conducted. A second temporal signal profile of the backscattered signals is recorded. The current position of the vehicle in the sewer or pipeline system relative to the sought locations is determined by comparison with the first signal profile.

9 Claims, 3 Drawing Sheets

METHOD FOR RETRIEVING PREDETERMINED LOCATIONS IN SEWER AND PIPELINE SYSTEMS

TECHNICAL FIELD

The present invention relates to a method for retrieving locations in sewer and pipeline systems following the application or the deposition of a layer of material by utilizing a carrier vehicle having a microwave sensor that emits microwave signals and receives backscattered microwaves. The invented method is particularly suited for use in the field of intelligent TV and sensor-based sewer and pipe inspection and renewal.

STATE OF THE ART

In the renewal of sewer and pipeline systems, such as for example sewer pipes in public and communal pipeline networks, frequently additional so-called in-liner pipes made of plastic material are inserted into the to-be-renewed pipe sections. However, when inserting these new inliner pipes to renew defect pipe sections, all house connections entering the pipe are covered. In a subsequent step, a pipe robot has to mill the covered connections free using a maneuverable milling head.

Presently, in order to locate these covered house connections, information about its known location from drawn from plans respectively preceding travelling along the pipe is utilized and the robot respectively the carrier vehicle bearing a milling head is positioned accordingly in the sewer respectively the pipeline system using its path-giver sensors.

A sufficiently accurate and reliable positioning of the milling tool before the covered house connection however still presents considerable problems with this state of the art technology. Determining the positioning only by means of the path-giver sensors of a reel attached to a robot respectively the robot itself have proven to be too inaccurate. Moreover, these values can be falsified by the robot's drive slip. Incorrect borings and thus expensive damage to the inserted inline pipe and the sewer pipe underneath are often the consequence. Furthermore, operator errors can occur with this type of positioning by the operator steering the robot from outside the sewer and pipeline system.

DE 19600085 A1 discloses a method for detecting holes in a pipe, in which a radar device moves along the inside the pipe along its longitudinal axis and emits signals transverse to the direction of movement and receives reflected signals. Holes, such as for example house connections can be localized, even after insertion of an inliner pipe, by means of subsequent evaluation of the reflection signals. However, the complex signal profile of the received signals makes this direct detection of holes in a pipe very expensive and susceptible to errors. Furthermore, this technology does not permit locating a random number of predetermined sites in the pipeline system.

DE 195 21 895 A discloses a comparable method for retrieving predetermined locations in sewer and pipeline systems after the application or the deposition of a layer of material, in which a carrier vehicle having a microwave sensor is utilized which emits microwave signals and receives backscattered microwave signals.

This method also has the previously described disadvantages.

The object of the present invention is to provide a method for relocating covered house connections or other sites in sewer and pipeline systems, which offers a great reliability and accuracy.

DESCRIPTION OF THE INVENTION

The object is solved using a method according to claim 1. Advantageous embodiments of the method are the subject matter of the subclaims.

In the present method, a carrier vehicle having a microwave sensor is employed, which emits microwave signals and receives backscattered microwave signals, for example a microwave backscatter sensor (MRS), as is known from DE 4340059 C2 for use for the inspection of sewer and pipeline systems. However, of course, any other microwave sensor can be utilized. In the present application, carrier vehicle refers to any type of transport means in sewer or pipeline systems, for instance also pneumatic-based pipe worms.

First, prior to the application or the deposition of a layer of material, a first run of the carrier vehicle inside the sewer or pipeline system is conducted in which the sought locations are detected by means of an imaging system, with a first temporal signal profile of the backscattered microwave signals, preferably amplitude and relative phase, is recorded in at least one section of the sewer or pipeline systems and the sought sites, such as for example house connections or specific markings on the inside wall of the pipe are marked in the first signal profile. Recording occurs preferably by transmitting the detected backscattered signals to a data processing station located outside the sewer respectively pipeline system. An operator sitting at this data processing station steers the carrier vehicle by remote control. Transmission may occur via a cable in real time.

It is not necessary to record the backscattered signals along the entire sewer or pipeline system. But rather it suffices to record in a section in which the interesting respectively sought sites are located. Marking in the signal profile occurs preferably by the operator pressing the appropriate button during data transmission as soon as the carrier vehicle is situated at the corresponding position and, if required, the correct roll angle of the setup with the microwave sensor located on the carrier vehicle is set. As an alternative, marking can occur automatically or semi-automatically using a reference measurement system. The recorded data are stored.

After the application or the deposition of the layer of material, a second run of the carrier vehicle is conducted. During the run, a second temporal signal profile of the system microwave signals is recorded, again in the corresponding section of interest. This second signal profile is continually compared with the first stored signal profile and the current position of the carrier vehicle in the sewer and pipeline system relative to the sought sites is determined from this comparison.

The invented method is based on understanding that the profile of the measured backscatter microwave signals, regarding amplitude and phase, during an inspection run of the carrier vehicle respectively of the robot along the pipe or the sewer possesses a characteristic signal pattern at the house connections and in the remaining course of the pipe or sewer, which can be clearly identified despite certain changes even after inserting inliner pipes or deposition of residue in the pipe. Particularly advantageous is the use of suited evaluation methods, for example correlation or fuzzy methods.

This permits certain retrieval and sufficiently accurate localization of house connections or other locations covered by inline pipes or deposits. Due to the characteristic signal pattern, which is still recognizable after the application or the deposition of the layer of material, varying elongation of the time axis or the path axis in the signal profile, which for example can occur due to varying velocities or slip during the first and the second run, can be corrected at any time. The characteristic signal pattern is independent of the accuracy of the employed path giver and of the drive concepts and always delivers accurate information for retrieval of the covered locations.

The carrier vehicle is equipped with an imaging device which transmits images of the interior of the sewer respectively pipe system in real time to a receiving station located outside the sewer respectively outside the pipeline system where the operator can detect the sought locations with the aid of the transmitted images and marks them in the signal profile. Particularly suited as the imaging system is a TV camera like those already attached to prior art pipe inspection vehicles. However, other imaging systems can, of course, also be used, for example ultrasonic imaging systems, as long as the operator can detect the sought locations in the transmitted images.

Various possibilities of carrying out the invented method for retrieving covered house connections are described in the following. However, other alternatives than the described ones are, of course, also available to someone skilled in the art.

Sufficiently accurate localization of the covered house connections respectively of subsequent positioning of the milling tool requires two successive runs. The first run, referred in the following as the reference run, occurs before insertion of the inliner pipe and has the purpose to accurately measure the position of the not covered house connections using the robot's path giver. The second run, in the following referred to as the detection run, occurs after the insertion of the inliner pipes. During this run, the signal profile of the backscattered microwave signals is recorded again. Intelligent comparison, of the current measured signal profile and the signal profile recorded and stored during the reference run using suited methods, for example prior art correlation methods, permits correcting deviations of the path giver from the first run. The stored position and orientation of the covered house connections can be relatively accurately localized in this manner.

For the reference run, there are two possible manners of proceeding:

1. In operator-controlled referencing, the operator travels to each house connection individually and marks in the recording, for example by pressing a button, that, e.g. the camera is located exactly at the house connection position. The roll angle can also either be moved to directly with the camera or entered manually.
2. In sensor-controlled referencing, an inspection vehicle, for example having an additional light section sensor (LSS) module, is used. Visual 3D data about the pipe interior can be obtained with the aid of the LSS module. During the reference run, the operator travels slowly scanning the house connections. The camera can be directed straight ahead. LSS evaluation automatically determines the positions of the house connections, displays them and, if required, has the operator confirm them. A MRS program takes over these confirmed house connection positions (path and roll angle).

In both options, the signal profile of the microwave sensor is recorded over the robot's path-roll angle profile during the straight run. During the detection run, the MRS evaluation program, perhaps after passing by, shows how far the camera is away from the next house connection and at what roll angle the latter is.

Depending on the robot equipment, the milling procedure can commence during the detection run immediately after exact localization, for example by turning a turret axis axle, on which the milling head and the camera are attached, 180 degrees. Just as possible is only marking, e.g. colored marking, after termination of the detection run for a milling procedure to be executed at a later date.

WAYS TO CARRY OUT THE INVENTION

Figure 1:
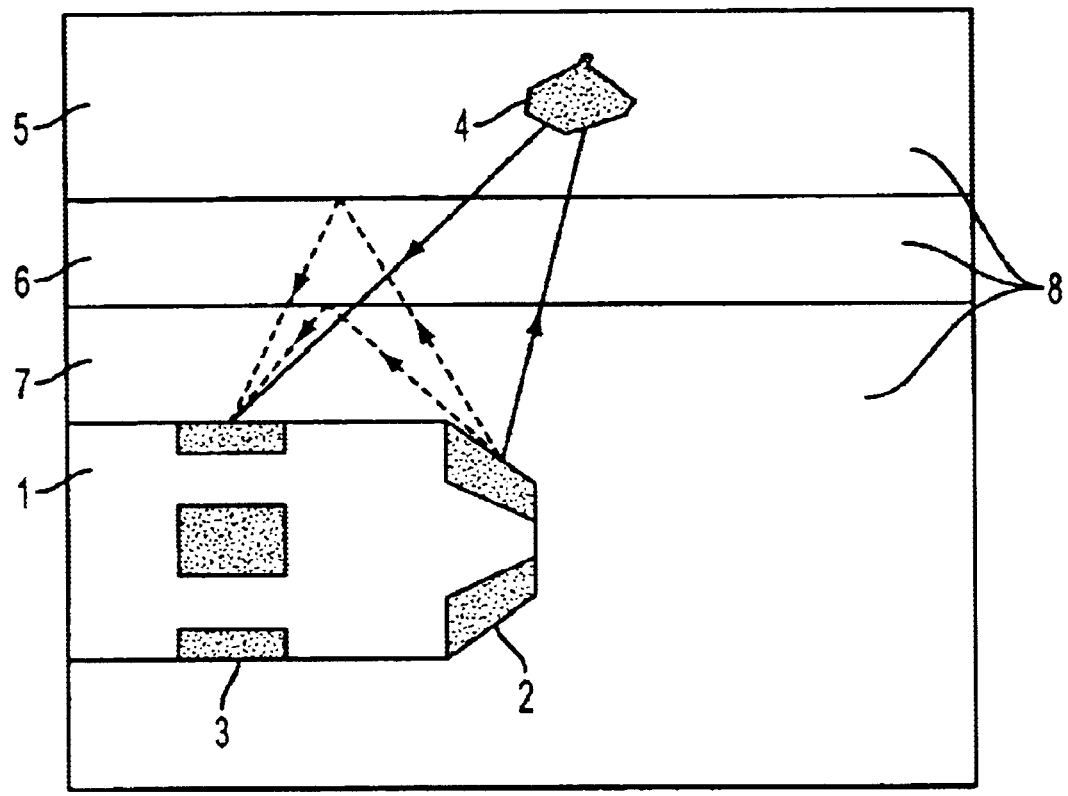
FIG. 1 illustrates the reflection of signals emitted from a microwave backscatter sensor, according to an embodiment of the invention.

In this example, a commercially available inspection robot equipped with a MRS module 1 as shown, by way of example, in FIG. 1 in sewer 7 is employed for the technical realization of the present method. The MRS module 1 is equipped with 4 transmission antennas 2 and 4 reception antennas 3, which are arranged evenly distributed around the entire circumference of the inspection robot. Transmission antennas 2 and reception antennas 3 are arranged staggered in the longitudinal direction, with the axes of the directional characteristic of transmission antennas 2 being aligned at an angle of approximately 45–60° to the longitudinal axis of the inspection robot, whereas the axes of the directional characteristic of the reception antennas 3 run perpendicular to this longitudinal axis. Such an arrangement largely suppresses undesired reflection signals from the pipe wall 6 so that the backscatter signals can be detected with greater sensitivity. FIG. 1 shows, by way of example, in a schematic representation the emitted signals reflected at an object 4, at the pipe bottom 5.

Figure 2:
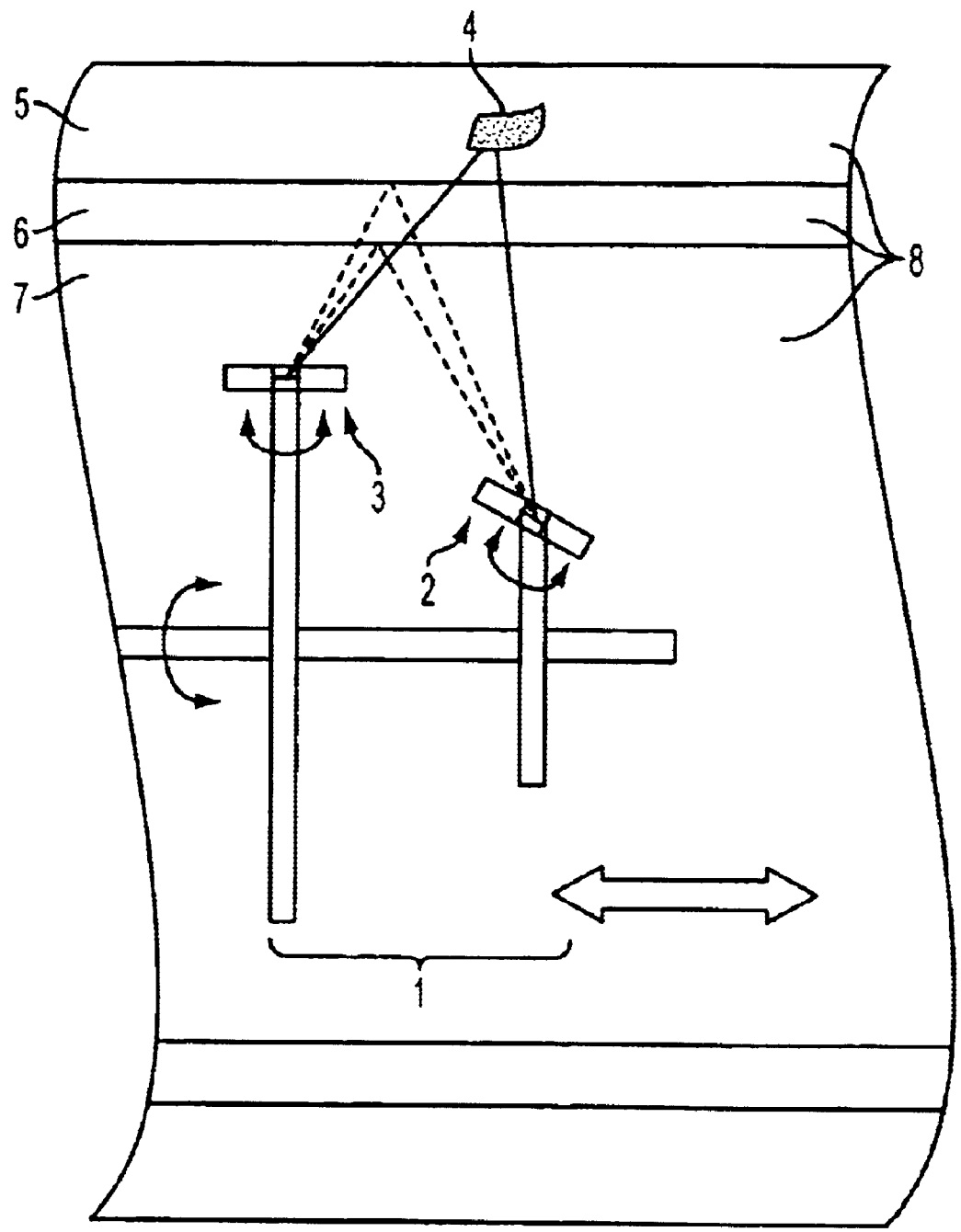
FIG. 2 illustrates the reflection of signals emitted from a microwave backscatter sensor, wherein the transmitting antenna is a rotary transmitting antenna and the receiving antenna is a rotary receiving antenna, according to an embodiment of the invention.

In an alternative embodiment, as shown in FIG. 2, it is also possible to only provide a rotary transmitting antenna 2 and a rotary receiving antenna 3, which are turned about the axis of the pipe.

The inspection robot is composed of a carrier vehicle on which a TV camera is arranged next to the MRS module. The carrier vehicle is connected via a trailing cable to a PC control station located outside the pipe. An operator sits at this PC control station who steers the inspection vehicle and the camera located thereon. The purpose of the trailing cable is, on the one hand, to supply the vehicle with energy and to transmit control signals to the vehicle and, on the other hand, to transmit camera signals and sensor signals from the vehicle. In the case of long pipe distances with a slippery bed, movement of the vehicle can be supported via an additionally provided power controlled hoisting winch, a reel.

Data communication with the PC occurs via a standard serial communication line with 19.2 Kbaud. As the amount of data picked up with the MRS module during a quick inspection run is too great for real-time transmission over this serial connection, the MRS signals are stored in the MRS module for a period of, e.g. 100 s (approximately 1 Mbyte). At a vehicle velocity of 3 m/min, this corresponds to an inspection route of 5 m. The data are then transmitted via the communication line to the PC control station as required. During this time the vehicle can remain standing, e.g. after passing a house connection. The detection run is preferably conducted with less speed in the interesting sewer section so that the data of this section can be transmitted in real time. Digitalization and, if required, intermediate storage of the MRS data occurs on the inspection robot, storage and evaluation of the data on the control PC. Of course, transmission of the data can also occur over other, in particular faster, connections so that real-time transmission is realizable even with faster vehicle velocity.

In carrying out the method, the operator first conducts a reference run with the inspection system before inserting the inliner pipe. In this reference run, he travels to all the house connections (individually). During the entire run, the MRS module picks up the backscatter signals of the emitted microwaves. The amplitude and phase (relative to the emitted CW microwave signals) of the received signals are detected dependent on the path-roll angle profile of the inspection vehicle. This profile information is available to the system via the path giver on the inspection vehicle. The control in the vehicle gives the MRS module, via a start signal (reset) and a path pacer respectively a time pacer, the path markers required for data buffering.

Figure 3:
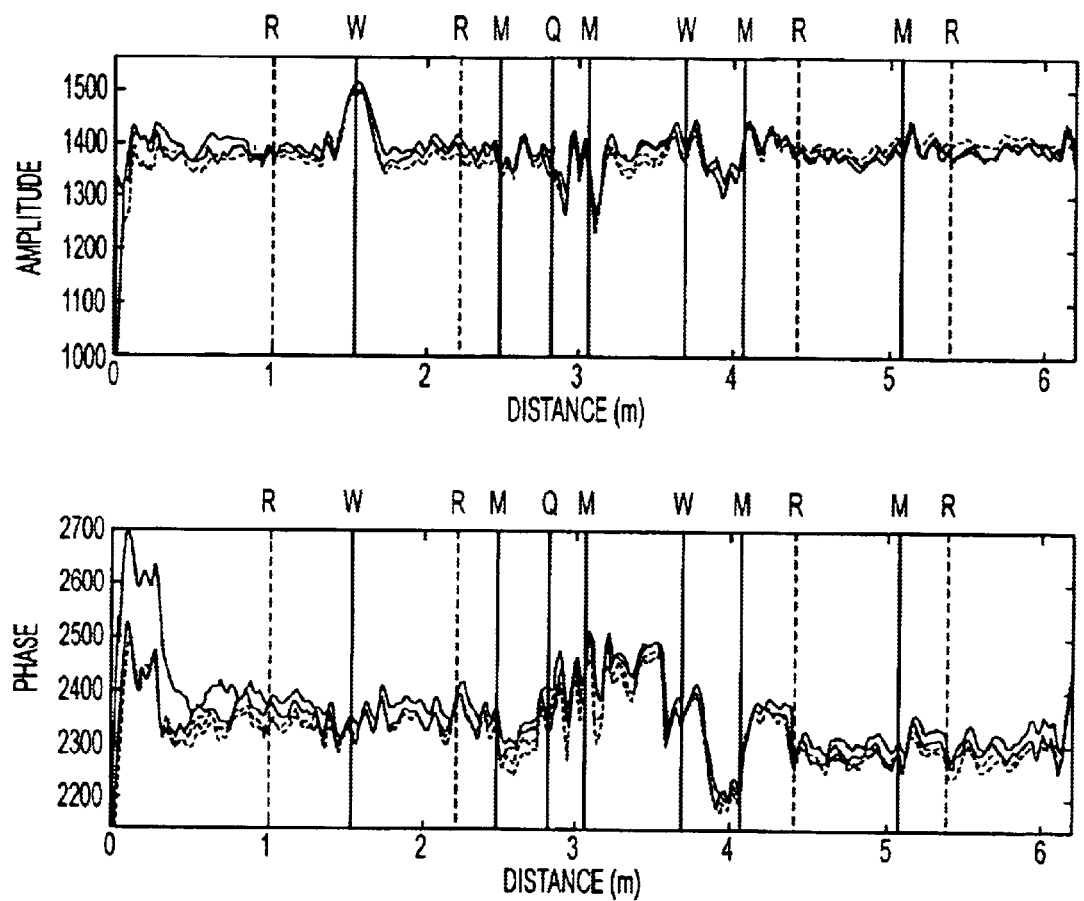
FIG. 3 is an example signal profile (amplitude and phase) of a backscattered microwave signal as produced by an embodiment of the invention.

FIG. 3 shows, by way of example a signal profile of the amplitude (bottom figure) an the phase (top figure) of the backscattered microwave signals dependent on the covered path and its reproducibility (in the figure with 5 identical measurement runs in a pipe). The position of a house connection is marked with an arrow. The characteristic profile of the signals, from which the position of the house connections can be located in the detection run, can be very readily identified.

The operator locates the position of the house connections from the images provided by the camera. The operator positions the camera, for example, perpendicular to the axis of the pipe and centers the camera with the vehicle and the roll angle in relation to the house connection. Upon assuming this position, the camera informs the MRS evaluation program that the camera is situated exactly at the position where the house connection is located. In this manner, this position can be allocated to a measured position on the path axis respectively the path-roll angle profile of the determined microwave data.

After recording these data, the inliner pipe can be inserted. Then the detection run with the inspection system is conducted. In this case, too, the signal profile of the MRS sensor is recorded via the robot's path-roll-angle profile during the straight ahead run. The determined data are continuously transmitted during the run to the control PC, which compares the signal profile with the previously recorded profile with the aid of a correlation method and using the marked signal pattern detects in this manner at any time the current position of the inspection vehicle relative to the next house connection independent of whether the path giver operates accurately or there are major uncertainties due to slip. Possible extension or compression of the signal profile due to varying slip is compensated in this manner. Upon reaching the covered house connection detected by means of the signal profile, the house connection is marked in color on the interior of the pipe by means of the marking device provided on the robot and the run is continued. Following marking the connections, a robot vehicle with a milling head and a TV camera can then enter the pipe and lay bare the house connection at the marked sites.

With the invented method, covered house connection pipes (DN 100 to 200) can be reliably and accurately detected respectively located again in sewer pipes (DN 300 to 500). By using a LSS sensor deviations in shape, for example bulging of the inliner over the house connection can be optimally detected and utilized as further evidence of a covered house connection.

List of Reference Numbers 1 microwave backscatter sensor
2 transmitting antenna(s)
3 receiving antenna(s)
4 object
5 pipe bed
6 pipe wall
7 sewer
8 dielectric structure of the sewer surroundings

What is claimed is:

1. A method for retrieving predetermined locations in sewer and pipeline systems after the application or the deposition of a layer of material, in which a carrier vehicle having a microwave sensor is used which emits microwave signals and receives backscattered microwave signals, characterized by having the following steps:

conduction of a first run inside said sewer respectively said pipeline system with said carrier vehicle before said application or said deposition of said layer of material in which said sought locations are detected by means of an imaging system, with in at least one section of said sewer respectively pipeline system a first temporal signal profile of said backscattered microwave signals being recorded and the sought locations being marked in said first signal profile; and conduction of a second run with said carrier vehicle after said application or said deposition of said layer of material, with a second temporal signal profile of said backscattered signals being recorded during said run and the current position of said carrier vehicle in said sewer respectively said pipeline system relative to said sought locations being determined by comparison with said first signal profile.

2. A method according to claim 1, wherein said first and said second signal profile include the amplitude and phase of said backscattered microwave signal.

3. A method according to claim 1, wherein a microwave backscatter sensor is utilized as said microwave sensor.

4. A method according to claim 1, wherein said microwave signals are amplitude modulated.

5. A method according to claim 1, wherein a radar sensor, which preferably runs in FM-CW or pulse radar operation, is utilized as said microwave sensor.

6. A method according to claim 1, wherein said imaging system is a camera, if required, with an additional light section sensor.

7. A method according to claim 1, wherein said comparison is carried out using a correlation method.

8. A method according to claim 1, wherein said first and said second temporal signal profile are normed on a path-roll-angle profile of said carrier vehicle respectively of said microwave sensor on said carrier vehicle.

9. A method according to claim 8, wherein the path is determined from a path-giver signal of said carrier vehicle or via a cable drum connected with it by a cable.

* * * * *